United States Patent
Boskett et al.

(10) Patent No.: US 7,942,460 B2
(45) Date of Patent: May 17, 2011

(54) PET LITTER SCOOPER

(76) Inventors: Michael Anthony Boskett, Orange, NJ (US); Helena Sylvia Levas, Orange, NJ (US)

( * ) Notice: Subject to any disclaimer, the term of this patent is extended or adjusted under 35 U.S.C. 154(b) by 0 days.

(21) Appl. No.: 11/971,667

(22) Filed: Jan. 9, 2008

(65) Prior Publication Data
US 2008/0164704 A1    Jul. 10, 2008

Related U.S. Application Data

(60) Provisional application No. 60/879,433, filed on Jan. 9, 2007.

(51) Int. Cl.
*A01K 1/01* (2006.01)
*A01K 29/00* (2006.01)

(52) U.S. Cl. .......................... 294/1.4; 294/1.3; 119/161

(58) Field of Classification Search .......... 294/1.3–1.5, 294/55; 119/161
See application file for complete search history.

(56) References Cited

U.S. PATENT DOCUMENTS

| | | | | |
|---|---|---|---|---|
| 2,511,560 | A | * | 6/1950 | Bechmann ............... 294/55 |
| 4,709,440 | A | * | 12/1987 | Conelly ............... 15/257.3 |
| D332,675 | S | * | 1/1993 | Simon ............... D30/162 |
| 6,039,368 | A | * | 3/2000 | Kowalczyk ............... 294/1.3 |
| 6,196,600 | B1 | * | 3/2001 | Miller ............... 294/1.4 |
| 6,209,729 | B1 | * | 4/2001 | Brouillard ............... 210/470 |
| 6,234,549 | B1 | | 5/2001 | Brownell |
| 6,416,097 | B1 | * | 7/2002 | O'Rourke ............... 294/55 |
| D507,083 | S | * | 7/2005 | Miller et al. ............... D30/162 |
| D564,718 | S | * | 3/2008 | Meyer ............... D30/162 |

* cited by examiner

*Primary Examiner* — Paul T Chin
(74) *Attorney, Agent, or Firm* — King & Spalding L.L.P.

(57) ABSTRACT

A litter scooper for quick and convenient removal of waste from pet litter boxes. The litter scooper may include a bowl having a front opening and a guard covering at least part of the front opening. The scooper may also include a handle of sufficient length to allow a user of the device to scoop litter without getting too close to the litter box and without bending.

15 Claims, 3 Drawing Sheets

PET LITTER SCOOPER

This patent application claims the benefit of Provisional Application Ser. No. 60/879,433, which is incorporated by reference in its entirety.

FIELD OF THE INVENTION

This invention generally relates to devices for removing pet waste from litter boxes, and more particularly to pet litter scoopers.

BACKGROUND

The removal of waste from pet litter boxes using currently available products is messy and inconvenient. Conventional litter scoops operate by sifting the litter to remove waste. However sifting requires shaking the scooper, which may cause waste to be displaced out of the removal apparatus. This may require repeated sifting and even cleanup of the area surrounding the litter box.

Moreover, operation of the prior art litter scoops typically requires the user to get physically close to the litter box, which creates several problems. Most obviously, proximity to pet waste is disagreeable. More seriously, for example, cats may become transmitters of toxoplasmosis, which contaminates the litter. Toxoplasmosis is especially dangerous for pregnant women. Finally, many users may find it inconvenient and even painful to bend in order to reach the litter box. Such is the case for elderly owners of pets.

SUMMARY OF THE INVENTION

In an embodiment, the invention provides a device for scooping litter, comprising a bowl having a front opening, holes formed in the bowl and dimensioned to separate litter from waste, and a guard covering at least part of the front opening. The front opening may be substantially wider than a back wall of the bowl. The bowl also may be at least approximately twice as long as it is wide. In one embodiment, the front opening has a width between approximately 4½ inches and 4¾ inches, and the bowl is approximately 9 inches long and 3½ inches deep. The holes may be rectangular slots arranged in a parallel pattern, and preferably have a size of approximately 3/16 of an inch. The guard may cover approximately half of the length of the front opening and preferably form a transparent window on the front opening. The guard may also be mounted on a hinge so as to allow opening of the bowl, and be secured during use.

The device may also include a plurality of claws extending upward from a bottom wall of the bowl. Each of the plurality of claws may extends approximately 1 inch in a direction parallel to the bottom wall, ¼ of an inch perpendicularly to the bottom wall, and ⅛ of an inch past a front edge of the bowl. The bowl may also have a wedge-shaped front edge.

In a further embodiment, the device may also comprise a handle connected to the bowl and a grip connected to the handle. The handle may have a length sufficient to achieve an overall length of the device which allows a user of the device to scoop litter without bending. The overall length of the device may be at least 27 inches. The handle may have a length extendable by a user. Further, the bowl, handle and grip may be arranged in an approximately straight line. The grip may include indented finger grips and have a length of approximately 7 inches and a diameter of approximately 1¼ inches. The grip may include a hole for hanging the device.

BRIEF DESCRIPTION OF THE DRAWINGS

Embodiments of the invention will now be described with reference to the appended drawings in which.

All the drawings are diagrammatic only and not to scale. Corresponding elements in different drawings are indicated by the same numerals.

DETAILED DESCRIPTION

Figure 1:
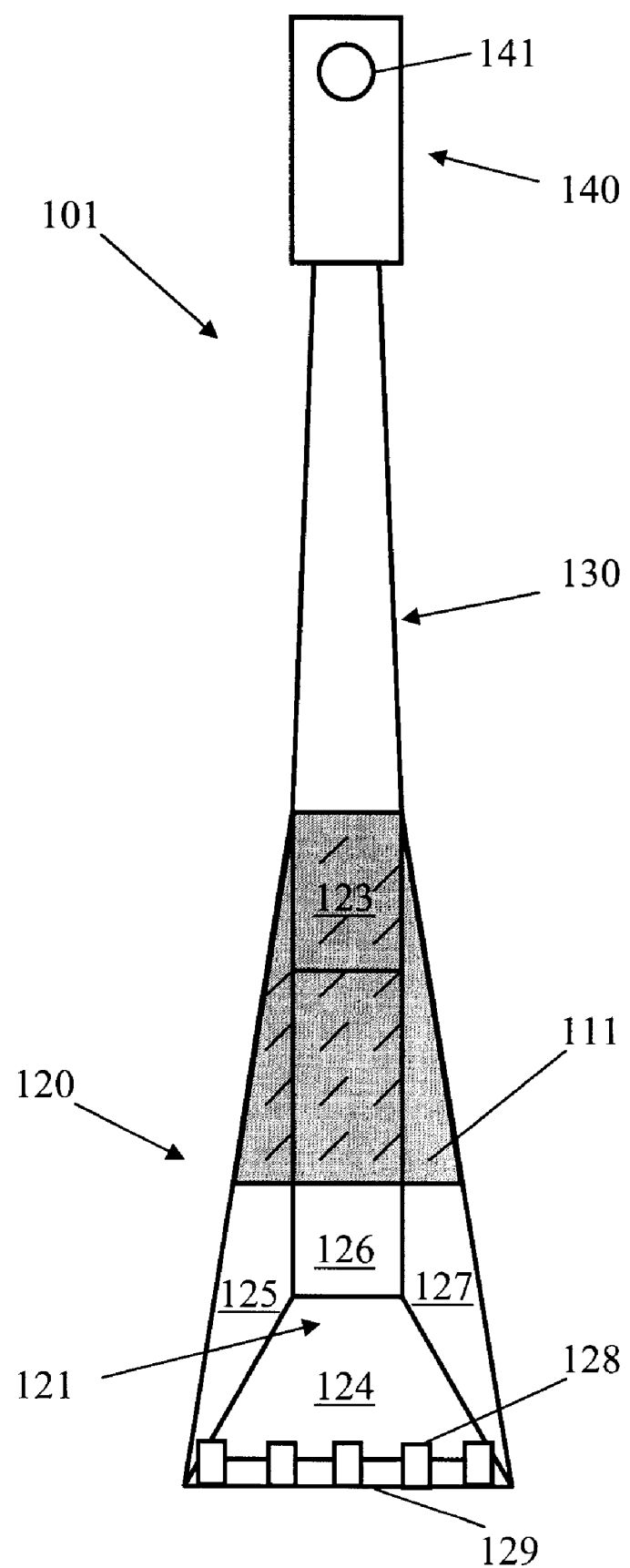
FIG. 1 shows a front view of an embodiment of the invention.
Figure 2:
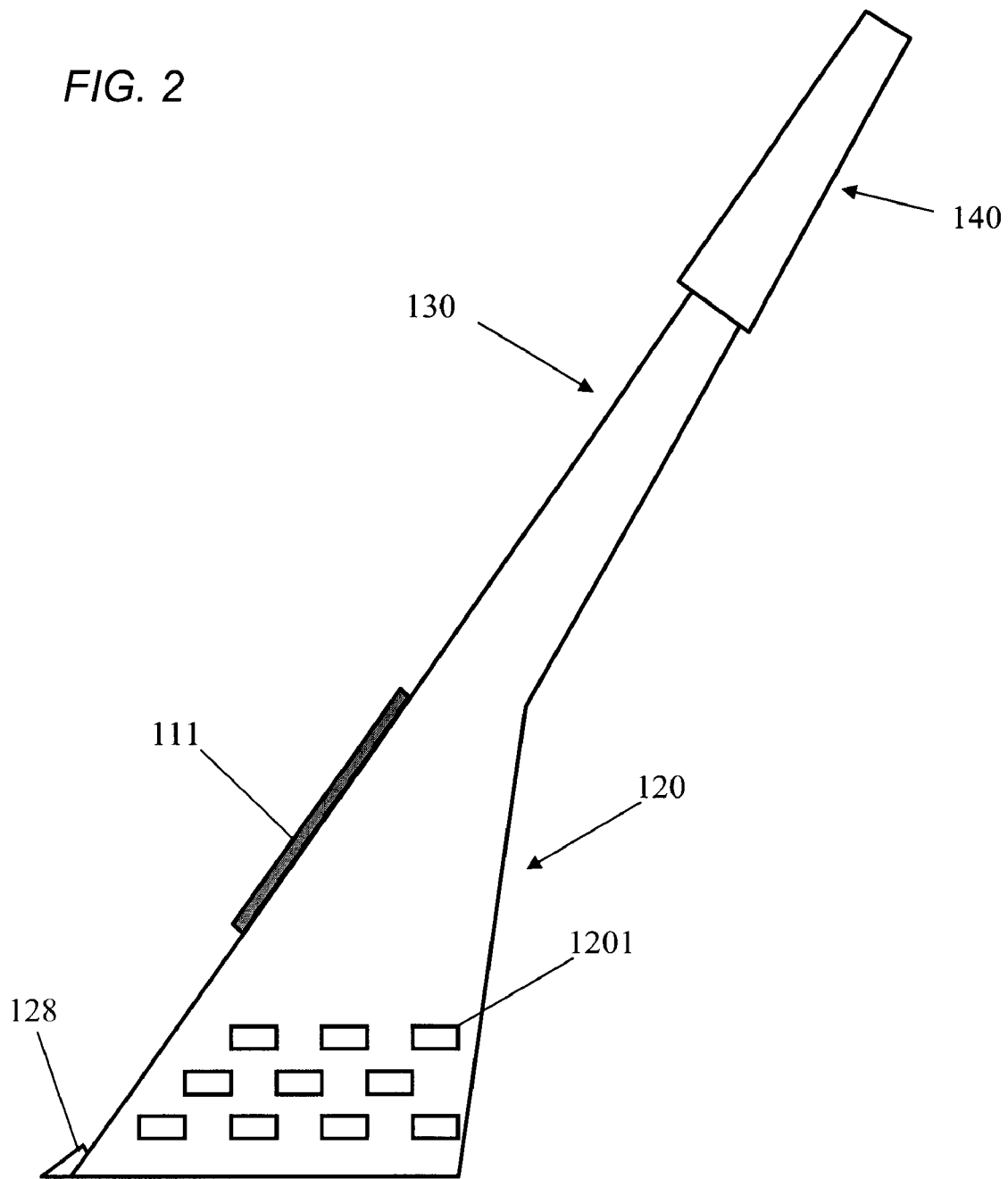
FIG. 2 shows a side view of the same embodiment.
Figure 3:
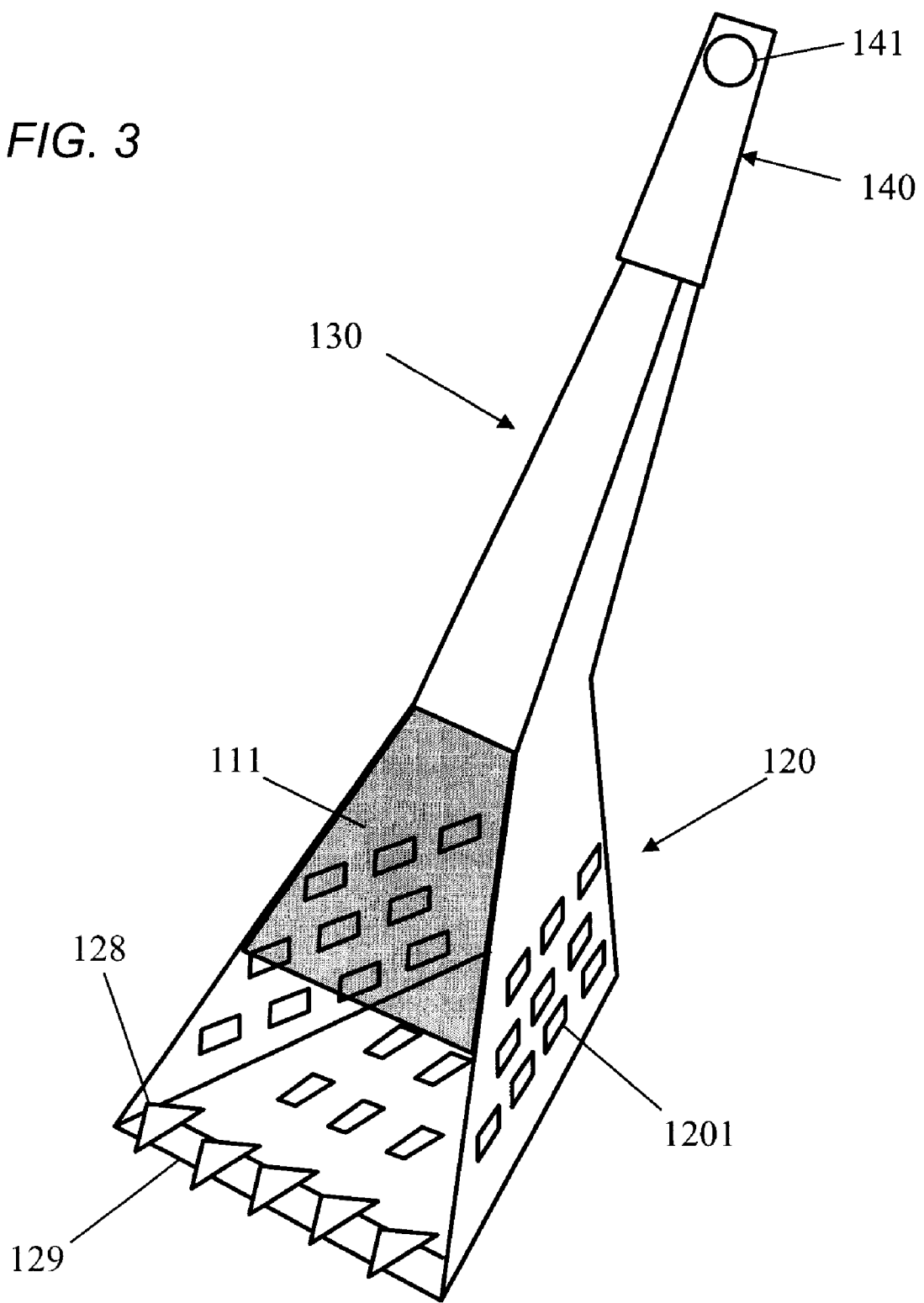
FIG. 3 shows a perspective view of the same embodiment.

FIGS. 1 through 3 shows front, side and perspective views of an embodiment of the invention, respectively. In this embodiment the litter scooper 101 includes three main parts, namely, a bowl 120, a handle 130, and a grip 140. For the sake of clarity, in the context of the embodiment depicted in the drawings, we use the terms "long" or "length" to indicate extension in the direction parallel to the handle 130, and the terms "wide" or "width" and "deep" or "depth" to indicate extension in the two directions perpendicular to the length, where the width dimension lies in the plane of FIG. 1 and the depth dimension lies in the plane of FIG. 2.

In this embodiment, the bowl 120 has a front opening 121 through which litter is collected. The front opening 121 allows access to a space delimited by top wall 123, bottom wall 124, left wall 125, back wall 126 and right wall 127. One or more of the walls 124, 125, 126 and 127 may include holes 1201 (omitted for clarity from FIG. 1) through which litter can be separated from waste. Holes preferably have a size of 4.8 mm (3/16 in). While the drawings show holes as rectangular slots arranged in a parallel pattern, it is understood that holes of any shape and arrangement may be used.

The bowl 120 may be dimensioned so as to have a "V" shape, where the front opening 121 is substantially wider than the back wall 126. This design helps the user move the waste and litter to the rear of the scooper bowl under the protection of the guard. This may be achieved by just lowering the handle of the litter scoop, causing the bowl 120 to pivot against the bottom of the litter box and forcing the contents of the bowl against the narrow back wall 126.

The bowl 120 may also be designed to be long and narrow as opposed to short and wide as in known prior art litter scoopers. In a particular embodiment, the front opening may be the widest part of the bowl 120, with a preferred width of 114.3 mm (4½ in) to 120.65 mm (4¾ in). At the same time, the overall length of the bowl 120 may preferably be 228.6 mm (9 in), meaning that the bowl is preferably at least approximately twice as long as it is wide.

Moreover, the bowl may be designed to be deeper than in known prior art litter scoopers. In an embodiment of the invention, the depth of the containment bowl of the scoop is preferably 88.9 mm (3½ in). This allows more waste to be separated in a shorter period of time.

The bowl 120 may also include a guard 111. The guard may cover a portion of the bowl. The guard helps to prevent the litter and waste from splashing when shaking the scooper to sift the litter. This may allow for faster waste separation, along with decreased physical contact with the litter and waste. In one preferred embodiment, the guard 111 is about 165.1 mm (6½ in) long, whereas the bowl 120 is 304.8 mm (12 in) long, i.e., the guard 111 covers approximately half of the length of the bowl.

The guard 111 may be made of a transparent or partially transparent material, such as transparent plastic, thus forming a transparent window. This allows the user to visually determine when the separation of waste from litter is complete. The guard may also be mounted on hinges to allow for ease of opening, for cleaning or inspection. Such a hinged embodiment may also include some apparatus to secure the hinged guard during use.

The bowl 120 may also include claws 128. The claws are positioned on the front edge of the scooper, extending upward from the bottom wall 124, and differ from the horizontally arranged teeth of prior art scoopers. The claws preferably extend approximately 25.4 mm (1 inch) in the longitudinal direction of the bowl 120, parallel to the bottom wall 124, and 6.35 mm (¼ in) upward from the bottom wall 124. Also, the claws preferably extend 3.175 mm (⅛ in) past the front edge 129 of the bowl. The claws make it easier to penetrate and break up the heavier wet solid litter which accumulates on the bottom of the litter box. By turning over the litter scooper 101 with the claws 128 pointing down toward the bottom of the litter box, the scoop may be used with a backward dragging motion to break up hardened litter. The embodiment depicted in the drawings includes five claws, however it is understood that any number of claws may be employed. The bowl 120 may also have a wedge-shaped front edge 129 to further facilitate scooping.

The handle 130 may be dimensioned to achieve a desired overall length which facilitates use of the litter scooper 101. In a particular embodiment this length may be around 685.8 mm (27 in), with the combined handle and grip being 381 mm (15 in) long. However the exact length will depend on the height and physical skills of the typical user. Moreover the handle may be made extendable so that a user may select an optimal length for convenience of use.

The availability of a long handle may allow waste scooping without having to get close to the litter box. This achieves two distinct advantages. First, the user's face and hands are not near the waste, thus reducing exposure to foul odors and also dangers to the user's health. Second, users who are elderly, disabled, in a wheel chair or with back problems will be able to clean the litter box with less bending.

The straight angle even plane design allows the litter scooper to act as a natural extension of the user's arm during the scooping process. The grip 140, handle 130 and bowl 120 are preferably on a straight line with each other and with the user's hand to allow more accuracy and strength during use.

The grip 140 is preferably an oversized, round easy grip, which allows users with limited flexibility to hold and maneuver the scooper with greater ease. The grip 140 may also include indented finger grips. This allows for greater control and easier handling during scooping. The grip preferably has a length of approximately 177.8 mm (7 in) and a diameter of approximately 31.75 mm (1¼ in). The grip 140 may also include a hole 141 for hanging the litter scooper.

While the invention has been described in conjunction with a specific embodiment, it will be appreciated that numerous alternatives, modifications, and variations are possible within the scope of the appended claims.

We claim:

1. A device for scooping litter, comprising:
   a bowl having a front opening;
   a plurality of claws extending upward from a bottom wall of the bowl and projecting past a front edge of the bowl, the claws being adapted to penetrate and break up solid litter;
   holes formed in the bowl and dimensioned to separate litter from waste;
   a guard covering at least part of the front opening;
   a handle connected to the bowl; and
   a grip connected to the handle,
   wherein the handle has a length sufficient to achieve an overall length of the device which allows a user of the device to scoop litter without bending.

2. The device of claim 1, wherein the front opening is substantially wider than a back wall of the bowl.

3. The device of claim 1, wherein the bowl is at least approximately twice as long as it is wide.

4. The device of claim 1, wherein the front opening has a width between approximately 4½ inches and 4¾ inches, and the bowl is approximately 9 inches long and 3½ inches deep.

5. The device of claim 1, wherein the holes are rectangular slots arranged in a parallel pattern.

6. The device of claim 1, wherein the holes have a size of approximately 3/16 of an inch.

7. The device of claim 1, wherein the guard covers approximately half of the length of the front opening.

8. The device of claim 1, wherein the guard forms a transparent window on the front opening.

9. The device of claim 1, wherein each of the plurality of claws extends approximately 1 inch in a direction parallel to the bottom wall, ¼ of an inch perpendicularly to the bottom wall, and ⅛ of an inch past the front edge of the bowl.

10. The device of claim 1, wherein the front edge of the bowl is wedge-shaped.

11. The device of claim 1, wherein the overall length of the device is at least 27 inches.

12. The device of claim 1, wherein the handle and grip are arranged in an approximately straight line with the front opening of the bowl.

13. The device of claim 1, wherein the grip includes indented finger grips.

14. The device of claim 1, wherein the grip has a length of approximately 7 inches and a diameter of approximately 1¼ inches.

15. The device of claim 1, wherein the grip includes a hole for hanging the device.

\* \* \* \* \*